(12) United States Patent
Khedekar

(10) Patent No.: US 9,951,776 B2
(45) Date of Patent: Apr. 24, 2018

(54) COMPRESSOR INTAKE MIXER SYSTEM

(75) Inventor: Prasad Ramdas Khedekar, Pune (IN)

(73) Assignee: CUMMINS INC., Columbus, IN (US)

( * ) Notice: Subject to any disclaimer, the term of this patent is extended or adjusted under 35 U.S.C. 154(b) by 1320 days.

(21) Appl. No.: 13/823,103

(22) PCT Filed: Aug. 31, 2011

(86) PCT No.: PCT/US2011/050007
§ 371 (c)(1),
(2), (4) Date: Sep. 16, 2013

(87) PCT Pub. No.: WO2012/036909
PCT Pub. Date: Mar. 22, 2012

(65) Prior Publication Data
US 2014/0010631 A1    Jan. 9, 2014

(30) Foreign Application Priority Data

Sep. 14, 2010 (IN) .......................... 2537/MUM/2010

(51) Int. Cl.
*F04D 3/00* (2006.01)
*F02B 33/00* (2006.01)
(Continued)

(52) U.S. Cl.
CPC ............... *F04D 3/00* (2013.01); *F02B 33/00* (2013.01); *F02M 21/04* (2013.01);
(Continued)

(58) Field of Classification Search
CPC ............. F02M 21/04; F02M 35/10118; F02M 35/10163; F02M 35/10209; F02B 33/00; F02B 37/16
(Continued)

(56) References Cited

U.S. PATENT DOCUMENTS 4,339,917 A    7/1982  LaGrone
4,426,848 A *  1/1984  Stachowicz ............. F02B 37/16
                                                123/568.12
(Continued)

FOREIGN PATENT DOCUMENTS

CN        1576563        2/2005
WO     2009/033005 A2    3/2009

OTHER PUBLICATIONS

International Search Report; PCT/US2011/050007; dated Apr. 10, 2012.
Written Opinion of the International Searching Authority; PCT/US2011/050007; dated Apr. 10, 2012.

*Primary Examiner* — Woody Lee, Jr.
*Assistant Examiner* — Maxime Adjagbe
(74) *Attorney, Agent, or Firm* — Faegre Baker Daniels LLP

(57) ABSTRACT

A compressor intake mixer system for internal combustion gas engines having a compressed charge bypass system comprises a bypass charge and fuel pre-mixer connected in line with the charge bypass system to reduce pressure gradient between the high pressure bypass charge and the low pressure fuel. A single volume main mixer is connected to the compressor inlet downstream of the pre-mixer to mix the flow of premixed charge and air and provide a mixed gas to the compressor inlet. Thus a need for a separate volume for a fuel mixer and a bypass mixer is eliminated and a single volume is provided at the compressor inlet. The locational constraint of necessarily locating the volumes at the compressor inlet is also obviated by providing a pre-mixer.

8 Claims, 6 Drawing Sheets

(51) Int. Cl.
*F02M 35/10* (2006.01)
*F02M 21/04* (2006.01)

(52) U.S. Cl.
CPC ............... *F02M 35/10118* (2013.01); *F02M 35/10163* (2013.01); *F02M 35/10209* (2013.01); *Y02T 10/144* (2013.01); *Y02T 10/32* (2013.01)

(58) Field of Classification Search
USPC ..... 123/568.12, 568.11, 568.13, 1 A; 60/611
See application file for complete search history.

(56) References Cited

U.S. PATENT DOCUMENTS

| | | |
|---|---|---|
| 6,003,316 A | 12/1999 | Baert et al. |
| 6,026,787 A | 2/2000 | Sun et al. |
| 6,378,506 B1 | 4/2002 | Suhre et al. |
| 6,725,831 B2 | 4/2004 | Asano et al. |
| 6,990,814 B2 * | 1/2006 | Boley ................. F02B 37/16 60/602 |
| 7,007,930 B1 | 3/2006 | Warner |
| 7,076,952 B1 | 7/2006 | Vetrovec |
| 7,395,818 B2 | 7/2008 | Fujisawa et al. |
| 2005/0011498 A1 | 1/2005 | Yoshiki et al. |
| 2005/0053887 A1 | 3/2005 | Westergaard |
| 2006/0092758 A1 | 5/2006 | Ellmers |
| 2009/0287391 A1 | 11/2009 | Duineveld et al. |

* cited by examiner

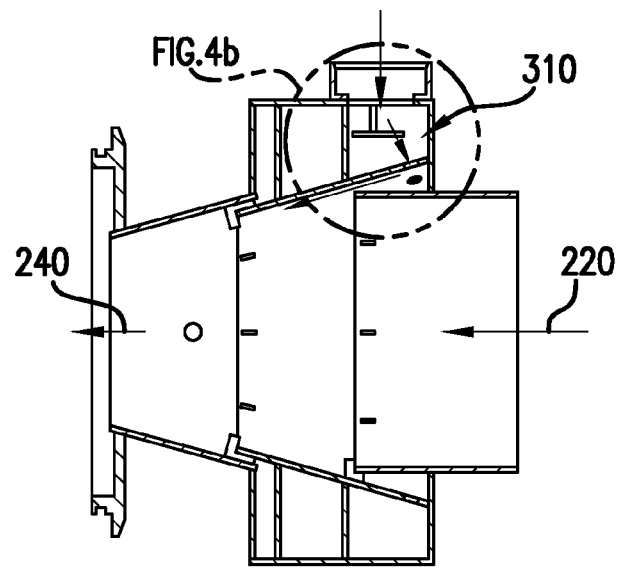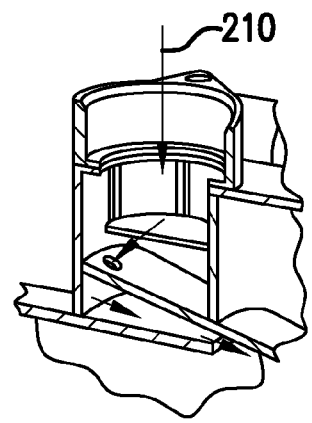
FIG.4a
PRIOR ART
FIG.4b
PRIOR ART
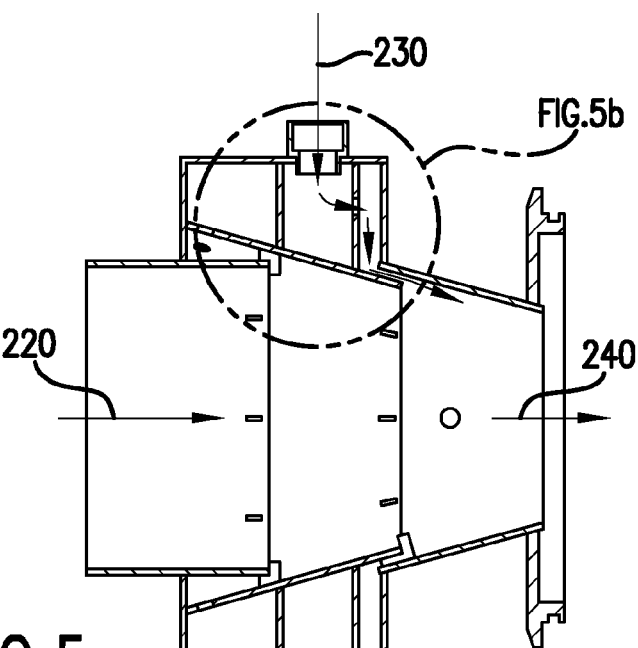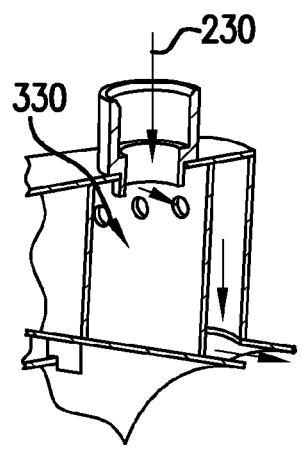
FIG.5a
PRIOR ART
FIG.5b
PRIOR ART

COMPRESSOR INTAKE MIXER SYSTEM

TECHNICAL FIELD

The present disclosure relates to the field of internal combustion gas engines.

In particular, the present disclosure relates to the field of mixers for compressor intake in internal combustion gas engines.

BACKGROUND

Many internal combustion gas engines have compressor bypass systems. A compressor bypass system bleeds off excessive pressurized charge (air and fuel) from a compressor outlet and returns the charge to a compressor inlet thereby bypassing the engine by recirculating the compressed gas to the compressor inlet. The engine's fuel system receives fuel at low pressure from a fuel source and mixes it in the compressor air inlet. The systems known in the art require separate mixers to handle the pressure gradient between the high pressure compressor bypass system and the low pressure fuel system.

SUMMARY

In accordance with the present disclosure, there is provided a compressor intake mixer system for internal combustion gas engines having a compressed charge bypass system comprising a compressor, a bypass charge line connected downstream of the compressor to direct a high pressure bypass charge from the compressor for recirculation, a bypass charge control valve adapted to govern a flow of bypass charge through the bypass charge line, a fuel supply line adapted to carry low pressure fuel, a fuel control valve and an air supply source, the compressor intake mixer system characterized by:
 a bypass charge and fuel pre-mixer including a pre-mixer housing positioned along the bypass charge line downstream of the bypass charge control valve, the pre-mixer connected to the fuel supply line and adapted to reduce pressure gradient between the high pressure bypass charge and the low pressure fuel and provide a flow of premixed charge of fuel and bypass charge; and
 a single volume main mixer including a mixer housing fluidly connected between the air supply source and the compressor, the mixer housing fluidly connected to the bypass charge line downstream of the pre-mixer housing, to mix the flow of premixed charge and air from the air supply source and provide a mixed gas to the compressor.

Preferably, in accordance with this disclosure, the mixer housing is spaced apart from the pre-mixer housing.

Typically, in accordance with this disclosure, the bypass charge and fuel pre-mixer is a venturi pump.

Preferably, in accordance with this disclosure, the bypass charge and fuel pre-mixer comprises:
a gas chamber disposed in the pre-mixer housing, the gas chamber being connected to the low pressure fuel supply line and the bypass charge line;
a bypass jet connected in line with the bypass charge line and disposed inside the gas chamber, the bypass jet adapted to have a convergent section to convert pressure energy of the bypass charge to kinetic energy and suck the fuel from the fuel supply line to provide the flow of premixed charge of fuel and bypass charge in the gas chamber; and a diffuser connected downstream of the pre-mixer housing, the diffuser adapted to receive the flow of premixed charge of fuel and bypass charge from the gas chamber and convert the kinetic energy back to a pressure head.

Typically, in accordance with this disclosure, the main mixer housing comprises:
a main body forming an air inlet adapted to receive air from the air supply source;
a single mixing and distributor volume extending annularly around the main body, the mixing and distributor volume adapted to receive the flow of premixed charge via an inlet port and continue mixing and distribution of the premixed charge;
a plurality of circumferentially spaced openings formed in the main body;
a mixing chamber adapted to receive the flow of premixed charge via the openings and mix the air with the premixed charge to generate the mixed gas; and
a mixed gas outlet adapted to deliver the mixed gas to the compressor.

Additionally, in accordance with the present disclosure, the bypass charge includes normal bypass flow and leakage flow of charge.

In accordance with another embodiment of the present disclosure, there is provided a compressor intake mixer system for mixing of high pressure bypass charge, low pressure fuel and air for internal combustion gas engines, the system comprising:
means to receive the high pressure bypass charge in a gas chamber of a bypass charge and fuel pre-mixer;
means to convert pressure energy of the bypass charge into kinetic energy;
means to suck the low pressure fuel into the gas chamber;
a first mixer adapted to mix the bypass charge with the fuel to provide a flow of premixed charge;
means to convert kinetic energy of the premixed charge back to a pressure head;
feeding means to feed the premixed charge to a main mixer; and
a second mixer adapted to mix the premixed charge with air in the main mixer.

In accordance with the present disclosure, there is provided a method of mixing compressor intake of high pressure bypass charge, low pressure fuel and air for internal combustion gas engines, the method comprising:
receiving the high pressure bypass charge in a gas chamber of a bypass charge and fuel pre-mixer;
converting pressure energy of the bypass charge into kinetic energy;
sucking the low pressure fuel into the gas chamber;
mixing the bypass charge with fuel to provide a flow of premixed charge;
converting kinetic energy of the premixed charge back to a pressure head;
feeding the premixed charge to a main mixer; and
mixing the premixed charge with air in the main mixer.

BRIEF DESCRIPTION OF ACCOMPANYING DRAWINGS

The disclosure will now be explained in relation to the accompanying drawings, in which:

FIGS. 4a and 4b illustrate details of the fuel mixer of FIG. 3;

FIGS. 5a and 5b illustrate details of the bypass mixer of FIG. 3;

DETAILED DESCRIPTION OF ACCOMPANYING DRAWINGS

The disclosure will now be described with reference to the embodiment shown in the accompanying drawings. The embodiment does not limit the scope and ambit of the disclosure. The description relates purely to the exemplary preferred embodiment of the disclosure and its suggested applications.

The drawings and the description hereto are merely illustrative and only exemplify the invention and in no way limit the scope thereof.

Conventional bypass systems known in the art are necessarily provided with two volumes at the compressor inlet.

Figure 1:
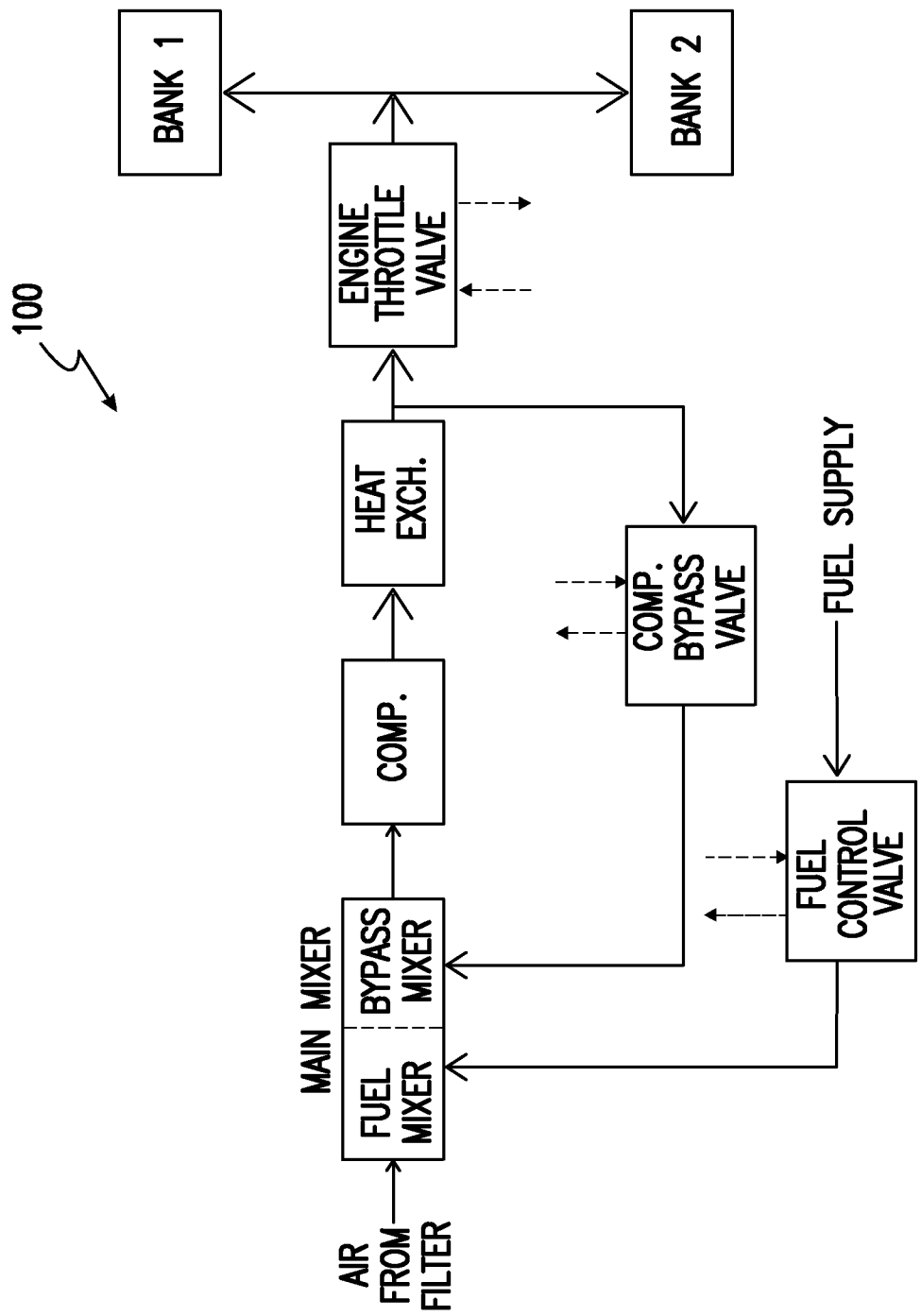
FIG. 1 illustrates a flow diagram of a compressor intake mixer system, known in the art, for gas engines.

FIG. 1 illustrates a flow diagram of a compressor intake mixer system, known in the art, for gas engines and is indicated generally by the numeral 100. The flow diagram illustrates how two volumes namely, a fuel mixer and a separate bypass mixer are provided as separate chambers in a main mixer to handle the pressure gradient between a high pressure compressor bypass system and a low pressure fuel system in the main mixer. The dotted arrows to and from an engine throttle valve, a compressor bypass valve and a fuel control valve represent signals to and from an ECM (Electronic Control Module). The flow of engine charge, compressor bypass and fuel supply are indicated by arrows of varying thickness.

Figure 2:
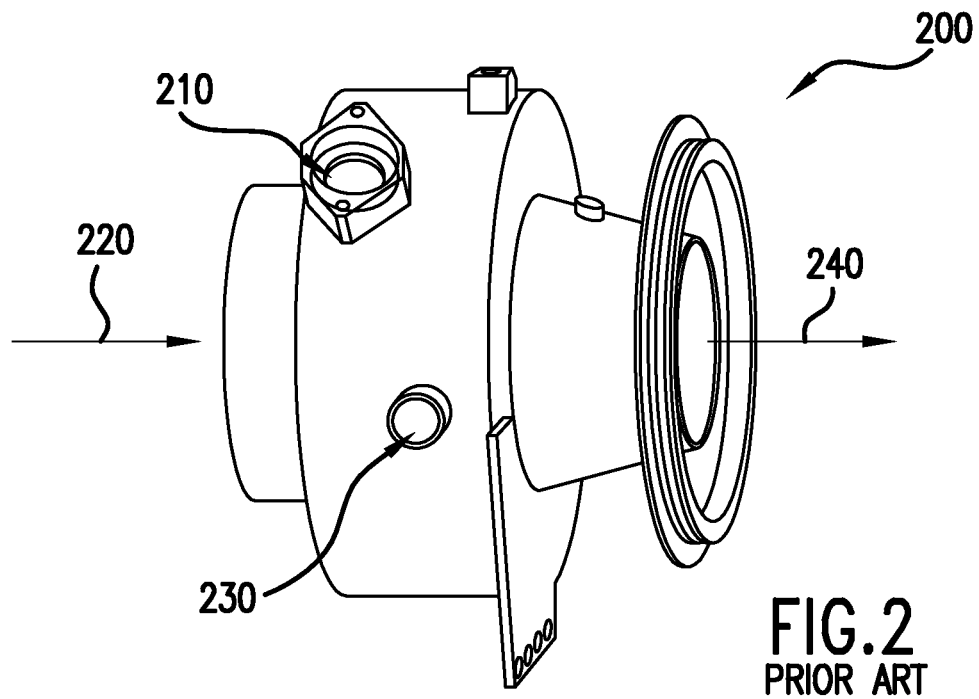
FIG. 2 illustrates details of the main mixer of the system of FIG. 1.

FIG. 2 illustrates details of the main mixer of the system of FIG. 1 and is indicated generally by the numeral 200. A fuel inlet port is indicated by the numeral 210, air enters an air inlet port as indicated by the numeral 220, a bypass charge inlet port is indicated by the numeral 230, and the numeral 240 indicates the outlet port to the compressor inlet.

Figure 3:
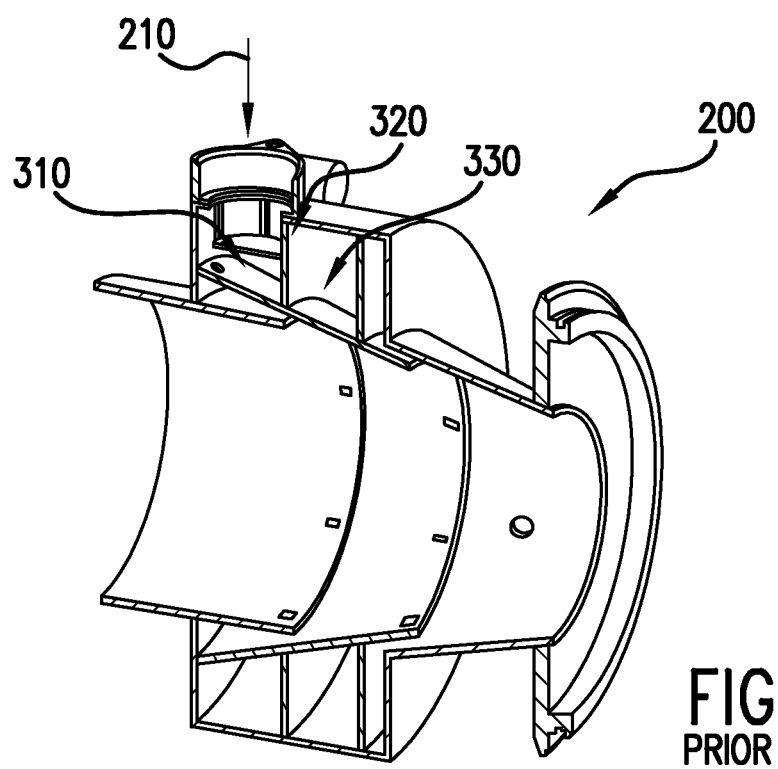
FIG. 3 illustrates a sectional view of the main mixer of FIG. 2.

FIG. 3 illustrates a sectional view of the main mixer 200 of FIG. 2. The fuel mixer or distributor is indicated by the numeral 310 and the bypass charge mixer or distributor is indicated by the numeral 330. The fuel distributor 310 and the bypass charge distributor 330 are separated by a partition indicated by the numeral 320, thus illustrating how two separate distributor volumes are provided, i.e. integrated into body of the main mixer 200 in the systems known in the art. Each distributor volume or box 310, 330 extends annularly around the main mixer 300 to produce a circumferential distribution of the fuel and bypass charge, respectively, into the main mixer chamber.

FIGS. 4a and 4b illustrate details of the fuel mixer of FIG. 3. The fuel enters through the fuel inlet port 210, the air enters through the air inlet port 220 and the charge to compressor exits through the outlet port 240.

FIGS. 5a and 5b illustrate details of the bypass mixer of FIG. 3. The numeral 230 indicates the bypass charge inlet, whereas the numerals 220 and 240 generally indicate the air inlet and the charge to compressor respectively.

The applicant has recognized that multiple mixer volumes that produce a uniform circumferential distribution of gases are large and inconvenient to package besides being expensive to manufacture. Furthermore, mixer volumes are characterized by locational constraint of necessarily locating the volumes at the compressor inlet. Thus, the conventional system with flow as illustrated in FIG. 1 and detailed further in FIGS. 2-5 has proven to be both expensive to construct due to high performance compressor requirements and inconvenient from an engine packaging point of view.

There is therefore a need for a compressor intake mixer that can cater to the following requirements of compressor bypass systems for gas engines:
simplified mixer design;
eliminate rigidity in the location of the mixer volume on the engine;
convenient engine packaging;
a compact design; and
and a cost effective design.

Several attempts have been made to overcome drawbacks of the prior art. For instance, United States Patent Application US2009/0287391 discloses an engine fuel control system wherein the engine operational parameters are employed to manipulate the blend ratio of pipe line fuel and waste fuel. Again, United States Patent Application US2006/0092758 discloses a fluid mixing venturi having a good signal to flow ratio for an improved response. Several other attempts like those disclosed in U.S. Pat. No. 6,026,787, U.S. Pat. No. 6,725,831, U.S. Pat. No. 7,007,930, U.S. Pat. No. 7,395,818, US20050053887 and WO2009033005A2 have been directed towards this field. However, none of the disclosures use the flow through the bypass/recirculation charge line, including leakage bypass charge flow energy through a bypass control valve, for creating suction and mixing the bypass charge and fuel.

Therefore, in accordance with the present disclosure, an engine system and method, and a compressor intake mixer, is envisaged that overcomes the drawbacks of the prior art and provides the following features:
a compact design;
effective use of compressor suction for air suction;
effective use of compressor bypass leakage to suck the low pressure fuel from the fuel source;
simplified mixer design;
eliminate rigidity in the location of mixer volume on the engine;
convenient engine packaging; and
a cost effective design.

Figure 6:
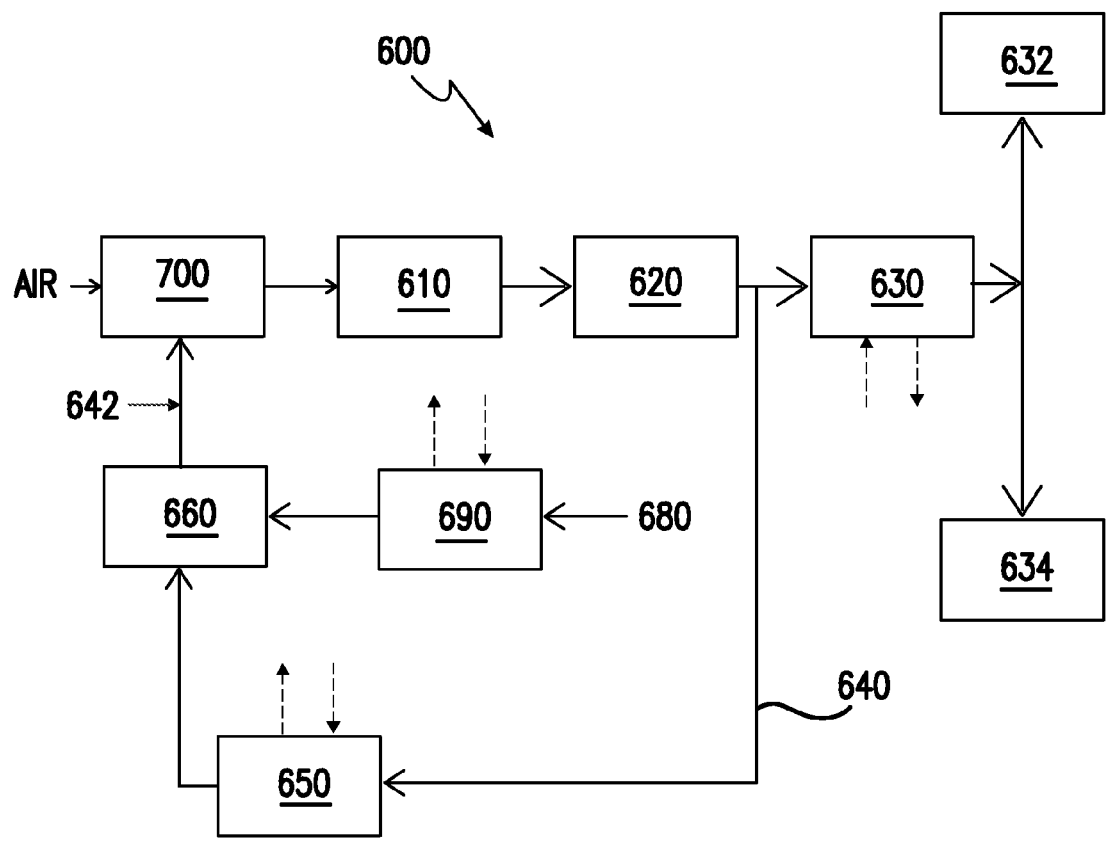
FIG. 6 illustrates a flow diagram of a compressor intake mixer system in accordance with the present disclosure.

FIG. 6 illustrates a flow diagram of a compressor intake mixer system in accordance with the present disclosure and is generally indicated by the numeral 600. Compressed charge from the compressor 610 goes to the engine through a heat exchanger 620 and the engine throttle 630 before flowing to one or more engine cylinders, i.e., a first bank of cylinders 632 and a second bank of cylinders 634. Partial charge needs to be bypassed back to the compressor inlet to avoid compressor surging during load rejection and low ambient conditions. The bypass mass flow through a bypass charge conduit or line 640 is governed by means of a bypass charge control valve 650, preferably, a butterfly type valve. This valve 650 has a tendency to leak some amount of the charge even when the valve is fully closed. Typically leakage is of the order of 0.5% to 1% of the total engine charge mass flow. The normal bypass flow with the valve in the open position, or partially open position, and the leakage flow with the valve in a closed position, is directed through a bypass fuel pre-mixer 660 which also receives fuel from a fuel supply 680 via a fuel control valve 690.

Figure 7:
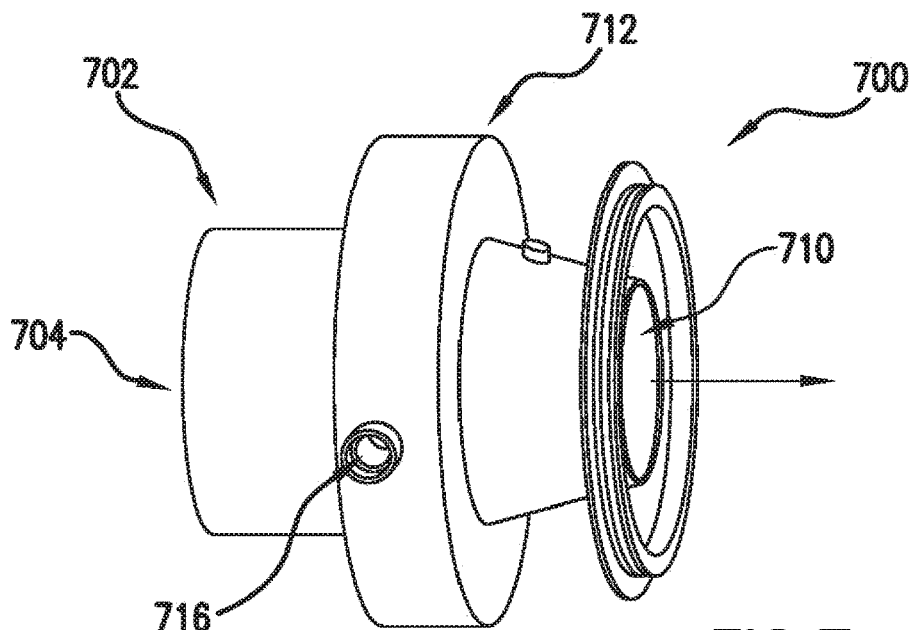
FIG. 7 illustrates details of the main mixer of the system of FIG. 6 in accordance with the present disclosure.

The compressor bypass charge, both normal flow and leakage flow, through the butterfly valve 650 is used to draw or suck low pressure fuel from the fuel source or supply 680. This allows mixing of the fuel and bypassed charge in a single gas chamber prior to the main mixer 700 (FIG. 7). The main mixer 700 also receives air from an air supply source.

The system in accordance with the present disclosure achieves this drawing or sucking effect, and eliminates one of the two volumes at the compressor inlet (as illustrated in FIG. 1), by employing an upstream bypass and fuel pre-mixer 660. The dotted arrows to and from the engine throttle valve, the compressor bypass valve and the fuel control valve represent signals to and from an ECM (Electronic Control Module). The flow of the engine charge, compressor bypass flow and the fuel supply are indicated by arrows of varying thickness.

Figure 8A:
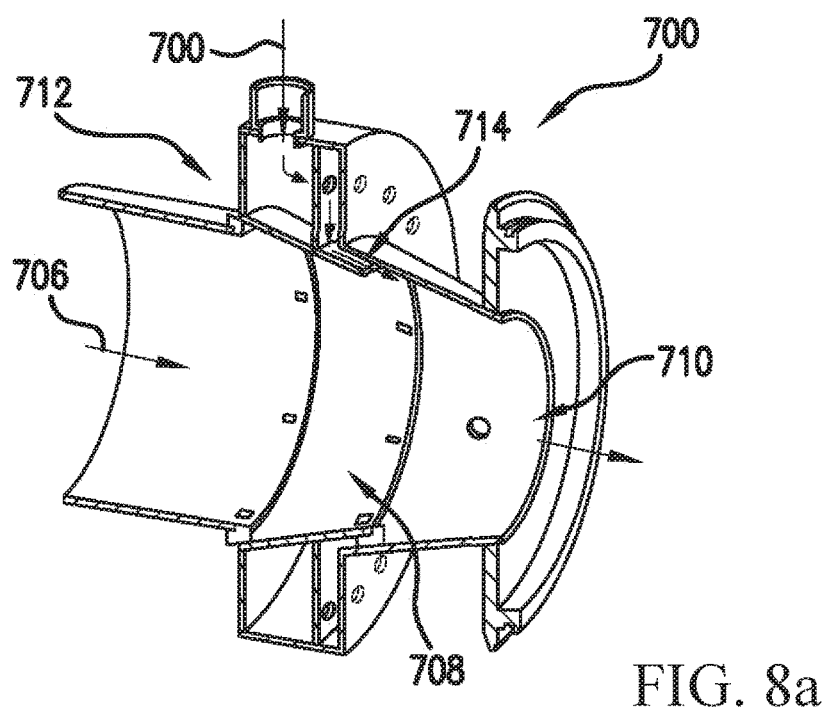
FIGS. 8a and 8b illustrate a sectional view of the main mixer of FIG. 7 in accordance with the present disclosure.
Figure 8B:
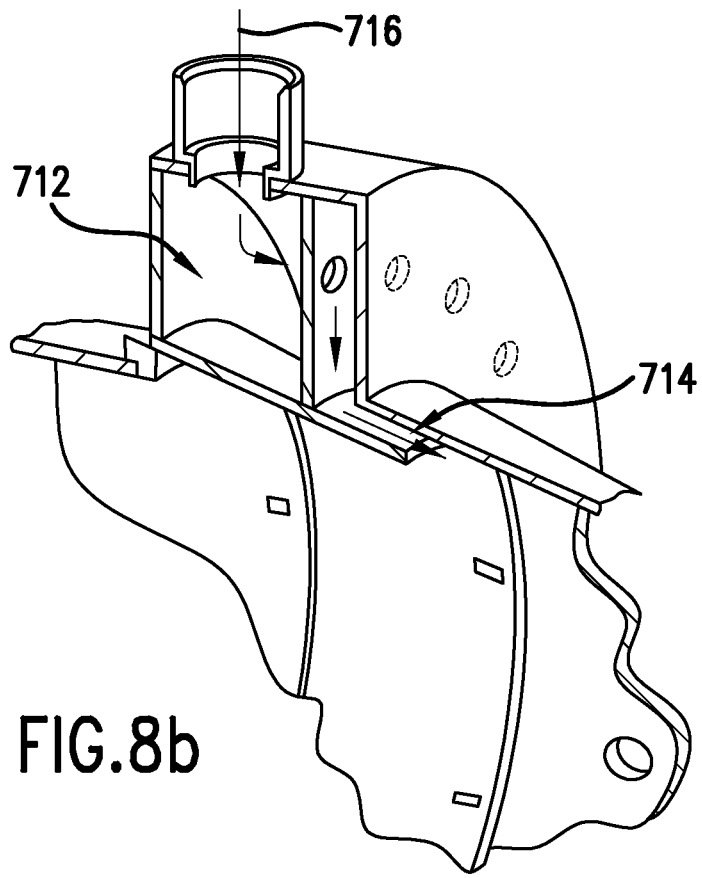

FIGS. 7, 8a and 8b illustrate details of the main mixer 700 of the system 600 of FIG. 6 in accordance with the present disclosure. The main mixer 700 includes a mixer housing 702 including a main body 704 forming an air inlet 706 to receive air from an air supply source via, for example, an air filter (not shown), a mixing chamber 708 to receive and mix a flow inlet air and a flow of premixed charge of fuel and bypass gas, and a mixed gas outlet 710 to deliver mixed gas to the compressor inlet. The mixer housing 702 also includes a single mixing and distributor volume or box 712 formed integrally with or mounted on the outer surface of main body 704 and extending annularly around main body 704 to continue mixing the bypass gas and fuel and to distribute this combination of into the mixing chamber 708 via circumferentially spaced openings 714 formed in main body 704. The single mixing and distributor box 712 includes a premixed charge (fuel and bypass) inlet port 716 for introducing the premixed combination into the bypass charge and fuel. The design of the mixer in accordance with the present disclosure wherein the premixed charge (bypass and fuel) is mixed with the air inlet simplifies and reduces the size of the mixer at the compressor inlet.

Specifically, the axial extent of the integrated mixing and distributor portion of the mixer housing 702, along the longitudinal axis of the mixer housing 702, is minimized, and therefore reduced relative to conventional designs.

Figure 9:
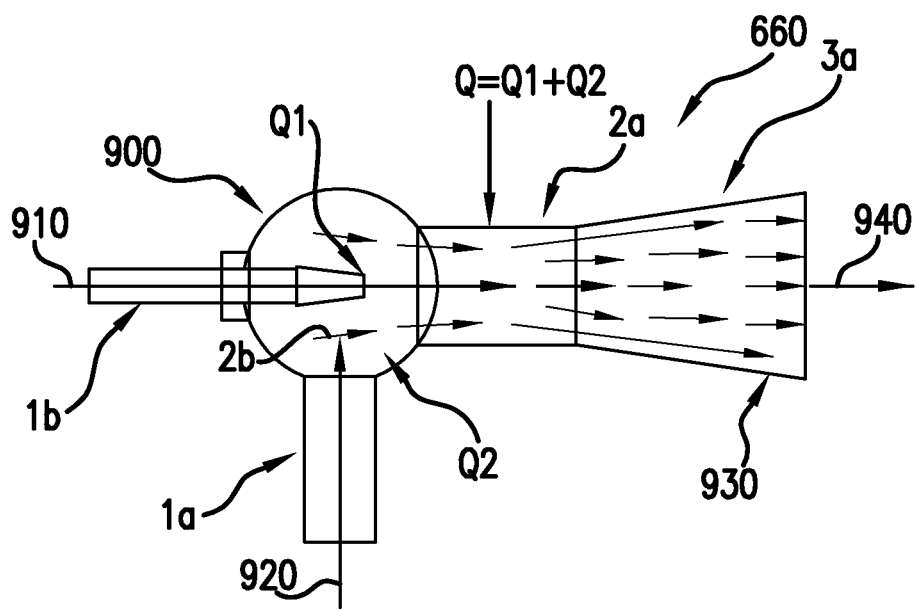
FIG. 9 illustrates details of the bypass and fuel pre-mixer of FIG. 6 in accordance with the present disclosure.

FIG. 9 illustrates details of the bypass and fuel pre-mixer of FIG. 6. The bypass and fuel pre-mixer 660 is preferably a venturi pump as illustrated. The pump includes a pre-mixer housing 900 including a gas chamber (bypass and fuel mixer) Q2 connected to a low pressure fuel supply line 1a and a bypass charge line 1b. The pressurized bypass charge, including any leakage when the valve is closed, indicated by the numeral 910, coming from the control valve 650 passes through the convergent section (1b to 2b) where pressure energy is converted into kinetic energy creating a low pressure region in the chamber Q2 and thus suction in the fuel supply line 1a. The gas chamber is indicated as Q2 and the bypass jet is indicated as Q1. The mixture of the bypass charge 910 and fuel 920 then passes through the throat Q to a diffuser 930 (extending from 2a to 3a) wherein the kinetic energy is converted back to a pressure head. The numeral 940 indicates premixed fuel and bypass charge which is fed to the main mixer 700 (illustrated in FIG. 6) by utilizing the bypass charge energy resulting in a single volume mixer at the compressor inlet. The bypass charge conduit 640 (illustrated in FIG. 6) includes a connecting portion 642 to connect the pre-mixer housing 900 to the main mixer housing 702 at the premixed charge (fuel and bypass) inlet port 716. In accordance with one aspect of the present disclosure, the mixer housing 702 is located a spaced distance away from the pre-mixer housing 900. Thus the main mixer 700 of FIG. 6 does not require two distributor/mixing boxes or volumes as required in the systems known in the art since the arrangement or system provides an upstream pre-mixer that reduces the pressure gradient between the bypass charge and fuel line thereby avoiding any back pressure into the fuel line.

The bypass and fuel pre-mixer 660, i.e. venturi pump, of the system in accordance with the present disclosure, is smaller than the required mixer volume of the current state of the art and may be located potentially at a variety of places on the engine since the pre-mixer 660 need not be physically attached to the main mixer but may be located a spaced distance from the main mixer. This feature is unlike the conventional mixer volume which must be located at the compressor inlet, thus eliminating rigidity in location enforced by the systems known in the art.

The system in accordance with the present disclosure also reduces the overall height of the gas engine air induction system and various interfaces like bypass and fuel mixer connections to the compressor inlet resulting in a compact and simple mixing system. By eliminating one mixing and distributor box at the main mixer, the main mixer body can be made smaller and more easily positioned within the packaging constraints of various engines.

TECHNICAL ADVANCEMENTS AND ECONOMIC SIGNIFICANCE

The technical advancements offered by the compressor intake mixer in accordance with the present disclosure which add to the economic significance of the disclosure include the realization of:

a compact design;

effective use of compressor suction for air suction;

effective use of compressor bypass leakage to suck the low pressure fuel from the fuel source;

simplified mixer design;

eliminate rigidity in the location of mixer volume on the engine;

convenient engine packaging; and a cost effective design.

The numerical values given of various physical parameters, dimensions and quantities are only approximate values and it is envisaged that the values higher or lower than the numerical value assigned to the physical parameters, dimensions and quantities fall within the scope of the disclosure unless there is a statement in the specification to the contrary.

Wherever a range of values is specified, a value up to 10% below and above the lowest and highest numerical value respectively, of the specified range, is included in the scope of the disclosure.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A compressor intake mixer system for internal combustion gas engines having a compressed charge bypass system comprising a compressor, a bypass charge line connected downstream of the compressor to direct a high pressure bypass charge from the compressor for recirculation, a bypass charge control valve adapted to govern a flow of bypass charge through the bypass charge line, a fuel supply line adapted to carry low pressure fuel, a fuel control valve and an air supply source, said compressor intake mixer system further including:
a bypass charge and fuel pre-mixer including a pre-mixer housing positioned along said bypass charge line downstream of the bypass charge control valve, said pre-mixer connected to said fuel supply line and adapted to reduce pressure gradient between the high pressure bypass charge and the low pressure fuel and provide a flow of premixed charge of fuel and bypass charge, said bypass charge and fuel pre-mixer further including a diffuser connected downstream of said pre-mixer housing; and
a single volume main mixer including a mixer housing fluidly connected between the air supply source and the compressor, said mixer housing fluidly connected to said bypass charge line downstream of said pre-mixer housing, to mix said flow of premixed charge and air from the air supply source and provide a mixed gas to the compressor.

2. The compressor intake mixer system as claimed in claim 1, wherein said mixer housing is spaced apart from said pre-mixer housing.

3. The compressor intake mixer system as claimed in claim 1, wherein said bypass charge and fuel pre-mixer is a venturi pump.

4. The compressor intake mixer system as claimed in claim 1, wherein said bypass charge and fuel-pre-mixer comprises:
a gas chamber disposed in said pre-mixer housing, said gas chamber being connected to the low pressure fuel supply line and the bypass charge line;
a bypass jet connected in line with the bypass charge line and disposed inside said gas chamber, said bypass jet adapted to have a convergent section to convert pressure energy of the bypass charge to kinetic energy and suck the fuel from the fuel supply line to provide said flow of premixed charge of fuel and bypass charge in said gas chamber; and
said diffuser adapted to receive said flow of premixed charge of fuel and bypass charge from said gas chamber and convert the kinetic energy back to a pressure head.

5. The compressor intake mixer system as claimed in claim 1, wherein said main mixer housing comprises:
a main body forming an air inlet adapted to receive air from the air supply source;
a single mixing and distributor volume extending annularly around said main body, said mixing and distributor volume adapted to receive said flow of premixed charge via an inlet port and continue mixing and distribution of said premixed charge;
a plurality of circumferentially spaced openings formed in said main body;
a mixing chamber adapted to receive said flow of premixed charge via said openings and mix the air with said premixed charge to generate said mixed gas; and
a mixed gas outlet adapted to deliver said mixed gas to the compressor.

6. The compressor intake mixer system as claimed in claim 1, wherein the bypass charge includes normal bypass flow and leakage flow of charge.

7. A compressor intake mixer system for mixing of high pressure bypass charge, low pressure fuel and air for internal combustion gas engines, said system comprising:
means to receive the high pressure bypass charge in a gas chamber of a bypass charge and fuel pre-mixer;
means to convert pressure energy of the bypass charge into kinetic energy;
means to suck the low pressure fuel into said gas chamber;
a first mixer adapted to mix the bypass charge with the fuel to provide a flow of premixed charge;
means to convert kinetic energy of said premixed charge back to a pressure head located downstream of said gas chamber of said bypass charge and fuel pre-mixer;
feeding means to feed said premixed charge to a main mixer; and
a second mixer adapted to mix said premixed charge with air in said main mixer.

8. A method of mixing compressor intake of high pressure bypass charge, low pressure fuel and air for internal combustion gas engines, said method comprising:
receiving the high pressure bypass charge in a gas chamber of a bypass charge and fuel pre-mixer;
converting pressure energy of the bypass charge into kinetic energy;
sucking the low pressure fuel into said gas chamber;
mixing the bypass charge with fuel to provide a flow of premixed charge;
converting kinetic energy of said premixed charge back to a pressure head downstream of the gas chamber;
feeding said premixed charge to a main mixer; and
mixing said premixed charge with air in said main mixer.

* * * * *